(12) United States Patent
Peters et al.

(10) Patent No.: US 11,585,271 B2
(45) Date of Patent: Feb. 21, 2023

(54) OIL RETURN PASSAGEWAY FOR ANNULAR ROTATING SEAL SEAT

(71) Applicant: Raytheon Technologies Corporation, Farmington, CT (US)

(72) Inventors: Robert E. Peters, Portland, CT (US); Arnold Zandonella, Jr., South Windsor, CT (US); Kurt Link, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/952,653

(22) Filed: Nov. 19, 2020

(65) Prior Publication Data
US 2021/0156306 A1 May 27, 2021

Related U.S. Application Data

(60) Provisional application No. 62/939,212, filed on Nov. 22, 2019.

(51) Int. Cl.
*F02C 7/06* (2006.01)
*F01M 1/02* (2006.01)
*F01M 11/02* (2006.01)

(52) U.S. Cl.
CPC .............. *F02C 7/06* (2013.01); *F01M 1/02* (2013.01); *F01M 2011/026* (2013.01); *F05D 2220/32* (2013.01); *F05D 2240/54* (2013.01); *F05D 2240/55* (2013.01)

(58) Field of Classification Search
CPC ....... F02C 7/06; F01M 1/02; F01M 2011/026; F05D 2220/32; F05D 2240/54; F05D 2240/50; F16J 15/164; F16J 15/3404; F01D 25/183

USPC ..................................................... 210/167.02
See application file for complete search history.

(56) References Cited

U.S. PATENT DOCUMENTS

| 4,406,459 A | 9/1983 | Davis et al. |
| 4,928,978 A * | 5/1990 | Shaffer ................. F16J 15/162 |
| | | 277/401 |
| 5,464,227 A | 11/1995 | Olson |
| 5,658,127 A | 8/1997 | Bond et al. |
| 10,233,762 B2 | 3/2019 | Maret et al. |

(Continued)

FOREIGN PATENT DOCUMENTS

FR 1488459 A 7/1967

OTHER PUBLICATIONS

European Search Report dated Apr. 26, 2021 issued for corresponding European Patent Application No. 20209324.1.

*Primary Examiner* — Yi-Kai Wang
(74) *Attorney, Agent, or Firm* — Bachman & Lapointe, P.C.

(57) ABSTRACT

A seal system for a bearing compartment of a gas turbine engine includes an annular rotating seal seat in contact with the seal element to form a dry seal interface therebetween to separate am oil-wetted zone from a dry zone. The annular rotating seal seat forms a dry zone annular space adjacent to the annular seal element and the rotating component. The annular rotating seal seat having an oil return passageway through the rotating seal seat to provide a communication path from the dry zone annular space outboard of the rotating component back to the oil-wetted zone.

14 Claims, 5 Drawing Sheets

(56) References Cited

U.S. PATENT DOCUMENTS 10,422,245 B2    9/2019  Cigal et al.
2018/0045316 A1* 2/2018  Kovacik ................ F01D 25/22

* cited by examiner

OIL RETURN PASSAGEWAY FOR ANNULAR ROTATING SEAL SEAT

CROSS REFERENCE TO RELATED APPLICATION

This application claims the benefit of provisional application Ser. No. 62/939,212, filed Nov. 22, 2019.

BACKGROUND

The present disclosure relates to a sealed bearing compartment of a gas turbine engine and, more particularly, to an oil return passageway for annular rotating seal seat.

Gas turbine engines typically contain bearing compartments, or other wetted chambers. The bearing compartments contain oil and typically include dynamic seals with an air buffered cavity to retain the oil within the bearing compartment. Typically, seal systems are positioned to prevent the high temperature and pressure air from flowing into sensitive areas.

Loss of oil from the bearing compartments, at the location of the seals in particular, can have negative consequences to engine performance, durability, or operation. Oil that weeps through the seal system may also seep into the compressor system or turbine. Oil weepage into the compressor may lead to imbalance concerns or customer bleed contamination while bleeding into the turbine may lead to thermal operational effects.

SUMMARY

A seal system for a bearing compartment of a gas turbine engine according to another disclosed non-limiting embodiment of the present disclosure includes an annular seal element; a rotating component adjacent the seal element; an annular rotating seal seat in contact with the seal element to form a dry seal interface therebetween to separate an oil-wetted zone from a dry zone, the annular rotating seal seat forming a dry zone annular space adjacent to the annular seal element and the rotating component; and the annular rotating seal seat having an oil return passageway through the rotating seal seat to provide a communication path from the dry zone annular space outboard of the rotating component back to the oil-wetted zone.

A further embodiment of any of the foregoing embodiments of the present disclosure includes that the dry seal interface is formed in part by an annular ridge of the annular seal element.

A further embodiment of any of the foregoing embodiments of the present disclosure includes that the dry zone annular space is formed in part by a recessed face between an inwardly facing shoulder and an outward facing shoulder of the annular rotating seal seat.

A further embodiment of any of the foregoing embodiments of the present disclosure includes that the outward facing shoulder of the annular rotating seal seat defines a radius R1 and the inwardly facing shoulder defines a radius R2.

A further embodiment of any of the foregoing embodiments of the present disclosure includes that the oil return passageway defines an inlet at an intersection between the outward facing shoulder of the annular rotating seal seat and the recessed face.

A further embodiment of any of the foregoing embodiments of the present disclosure includes that an inward facing seal edge of the seal element defines a radius R3 between R1 and R2.

A further embodiment of any of the foregoing embodiments of the present disclosure includes that the dry seal interface is formed in part by an annular ridge of the annular seal element, the annular ridge of the annular seal element defines a radial inner face outboard of the inward facing seal edge of the seal element.

A further embodiment of any of the foregoing embodiments of the present disclosure includes that the oil return passageway is one or an array of oil return passageways arranged about an engine central longitudinal axis, the oil return passageway angled with respect to the engine central longitudinal axis at an angle W from between 0-45 degrees.

A further embodiment of any of the foregoing embodiments of the present disclosure includes that the oil return passageway is one or an array of oil return passageways arranged about an engine central longitudinal axis, the oil return passageway skewed at an angle T from between 0-45 degrees.

A further embodiment of any of the foregoing embodiments of the present disclosure includes that the oil return passageway is one or an array of oil return passageways arranged about an engine central longitudinal axis, the oil return passageway angled with respect to the engine central longitudinal axis at an angle W from between 0-45 degrees and skewed at an angle T from between 0-45 degrees.

A seal system for a bearing compartment of a gas turbine engine according to another disclosed non-limiting embodiment of the present disclosure includes an annular seal element; a rotating component adjacent the seal element; an annular rotating seal seat in contact with the seal element to form a dry seal interface therebetween to separate am oil-wetted zone from a dry zone, the annular rotating seal seat forming a dry zone annular space adjacent to the annular seal element and the rotating component, the dry zone annular space formed in part by a recessed face between an inwardly facing shoulder and an outward facing shoulder of the annular rotating seal seat, the outward facing shoulder of the annular rotating seal seat defines a radius R1 and the inwardly facing shoulder defines a radius R2; and the annular rotating seal seat having an array of oil return passageways through the rotating seal seat around an engine longitudinal axis to provide a communication path from the dry zone annular space outboard of the rotating component back to the oil-wetted zone, each of the array of oil return passageways angled with respect to the engine central longitudinal axis at an angle W from between 0-45 degrees and skewed at an angle T from between 0-45 degrees.

A further embodiment of any of the foregoing embodiments of the present disclosure includes that the oil return passageway defines an inlet at an intersection between the outward facing shoulder of the annular rotating seal seat and the recessed face.

A further embodiment of any of the foregoing embodiments of the present disclosure includes that an inward facing seal edge of the seal element defines a radius R3 between R1 and R2.

A further embodiment of any of the foregoing embodiments of the present disclosure includes that the dry seal interface is formed in part by an annular ridge of the annular seal element, the annular ridge of the annular seal element defines a radial inner face outboard of the inward facing seal edge of the seal element.

A method for communicating wept oil back to an oil-wetted zone in a bearing compartment of a gas turbine engine according to another disclosed non-limiting embodiment of the present disclosure includes locating an oil return passageway in an annular rotating seal seat to provide a communication path from a dry zone annular space outboard of a rotating component back to an oil-wetted zone, the oil return passageway positioned to provide a pumping action at startup for weepage oil from an annulus in response to centrifugal action during engine operation.

A further embodiment of any of the foregoing embodiments of the present disclosure includes that the oil return passageway pumps startup weepage oil back to the oil-wetted zone.

A further embodiment of any of the foregoing embodiments of the present disclosure includes that locating the oil return passageway is one of an array of oil return passageways arranged about an engine central longitudinal axis, the oil return passageway angled with respect to the engine central longitudinal axis at an angle W from between 0-45 degrees.

A further embodiment of any of the foregoing embodiments of the present disclosure includes that the oil return passageway is one or an array of oil return passageways arranged about an engine central longitudinal axis, the oil return passageway skewed at an angle T from between 0-45 degrees.

The foregoing features and elements may be combined in various combinations without exclusivity, unless expressly indicated otherwise. These features and elements as well as the operation of the invention will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
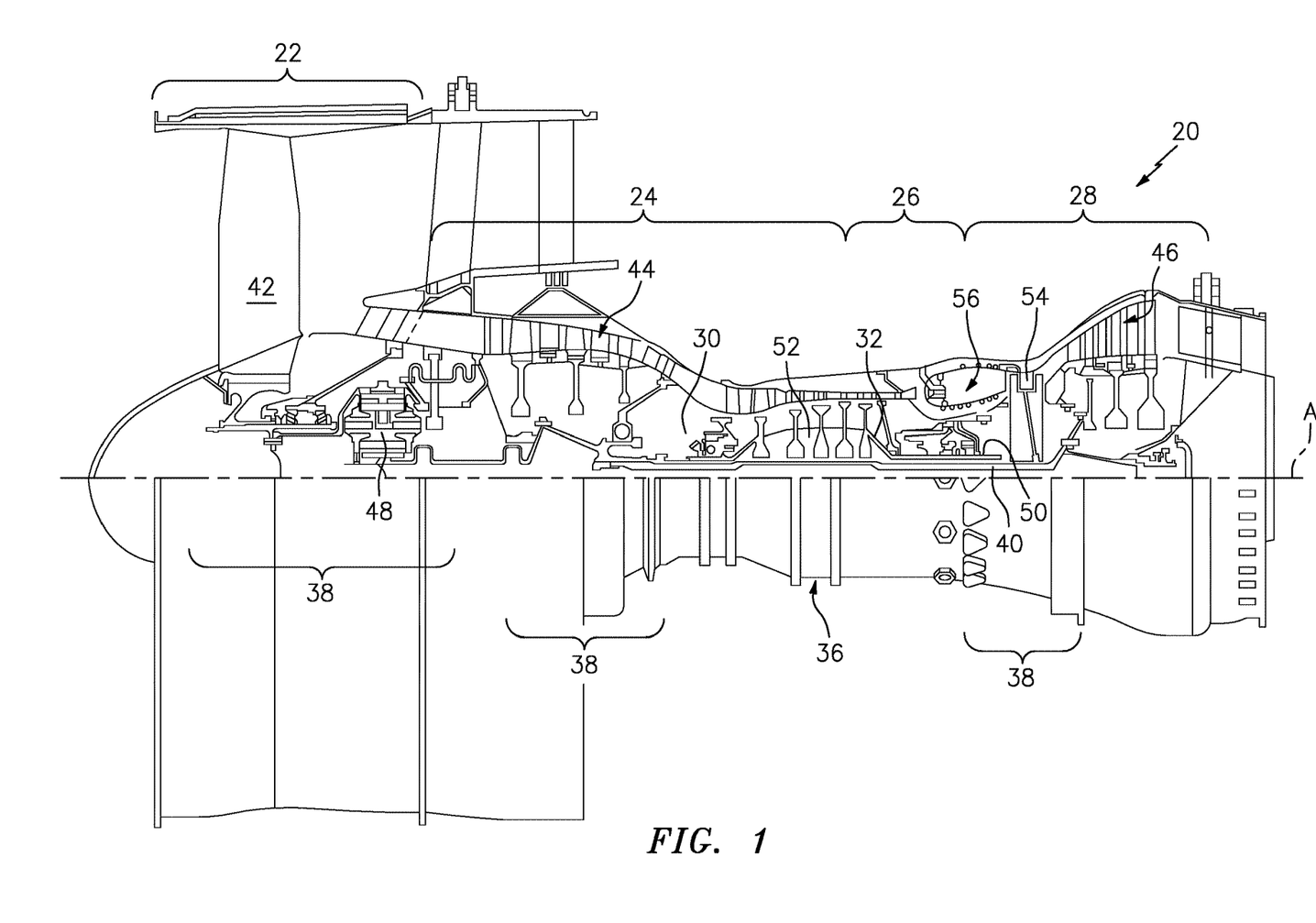
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures might include an augmentor section and exhaust duct section among other systems or features.

The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by respective bearing compartments 38.

Figure 2:
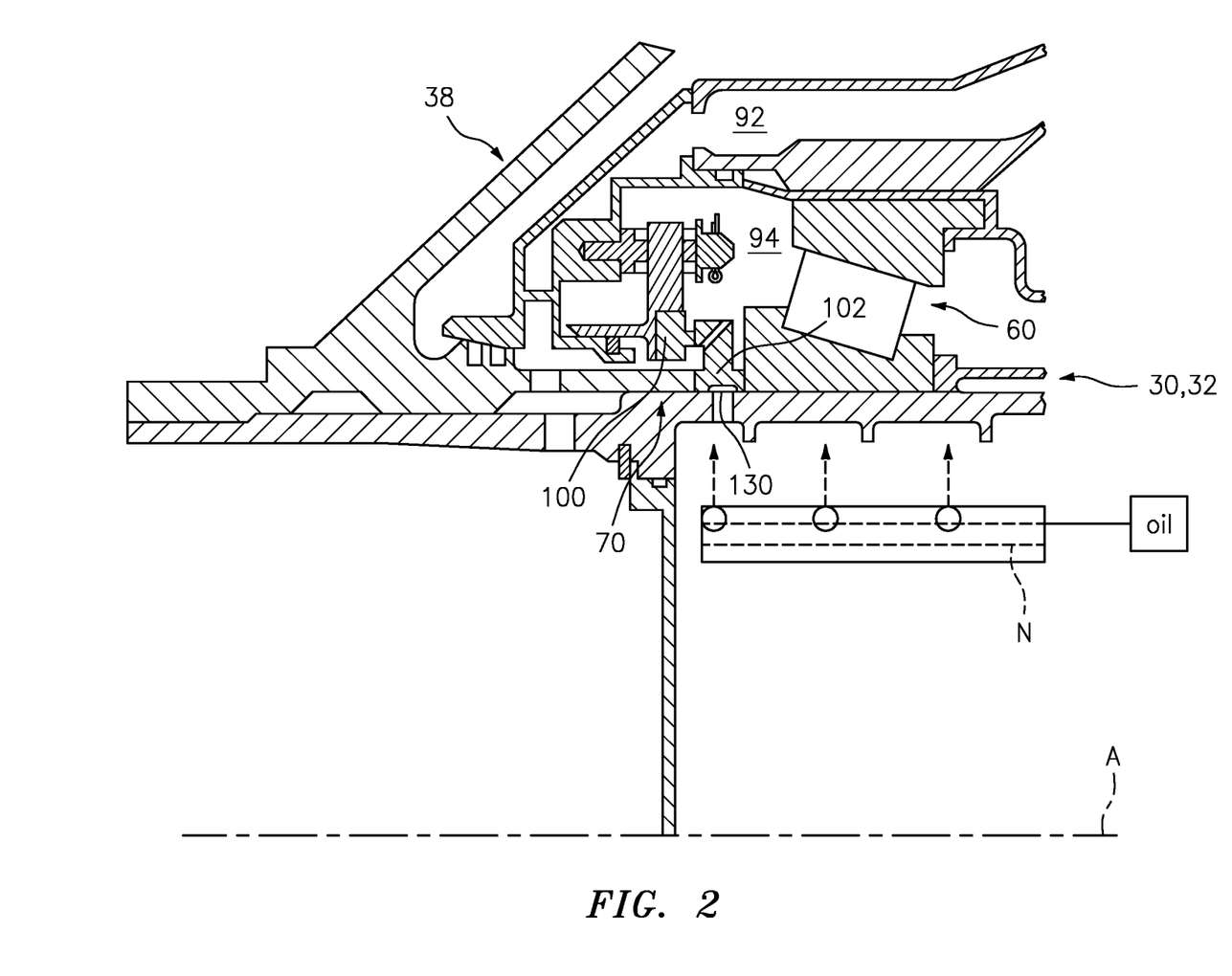
FIG. 2 is a sectional view of a bearing compartment.

With reference to FIG. 2, each of the multiple of bearing compartments 38 include one or more bearings 60 (one bearing of a bearing compartment illustrated schematically) and one or more seal system 70 (only the rear seal of the bearing compartment illustrated schematically). The bearing 60 and seal system 70 respectively support and interface with the shafts 40, 50 (FIG. 1) along the engine central longitudinal axis A.

The seal system 70 can include carbon seals, mechanical seals, brush seals, etc. The seal system 70 operates to seal the bearing compartments 38, i.e., an oil-wetted zone 94 from a buffer air cavity 92. So, for example, the interior of each bearing compartment 38 may be referred to as the oil-wetted zone while the region external thereto may be referred to as the dry zone. The bearings 60 support the low spool 30 and the high spool 32 and the seal system 70 separate the oil-wetted zone 94 from the dry zone 92 to define the boundaries of each bearing compartment 38. Oil and air are typically exposed to the higher pressure which is typically present in the buffer air cavity 92. A pump scavenges oil from the oil-wetted zone 94 which can then be introduced back into the oil-wetted zone 94 through a flow passage via spray nozzles N and the like which communicate with an annulus 130 in an outer diameter annular rotating seal seat 102 adjacent to an annular seal element 100 of the seal system 70. Although particular bearing compartments and bearing arrangements are illustrated in the disclosed non-limiting embodiment, other bearing compartments and bearing arrangements in other engine architectures will also benefit herefrom.

Figure 3:
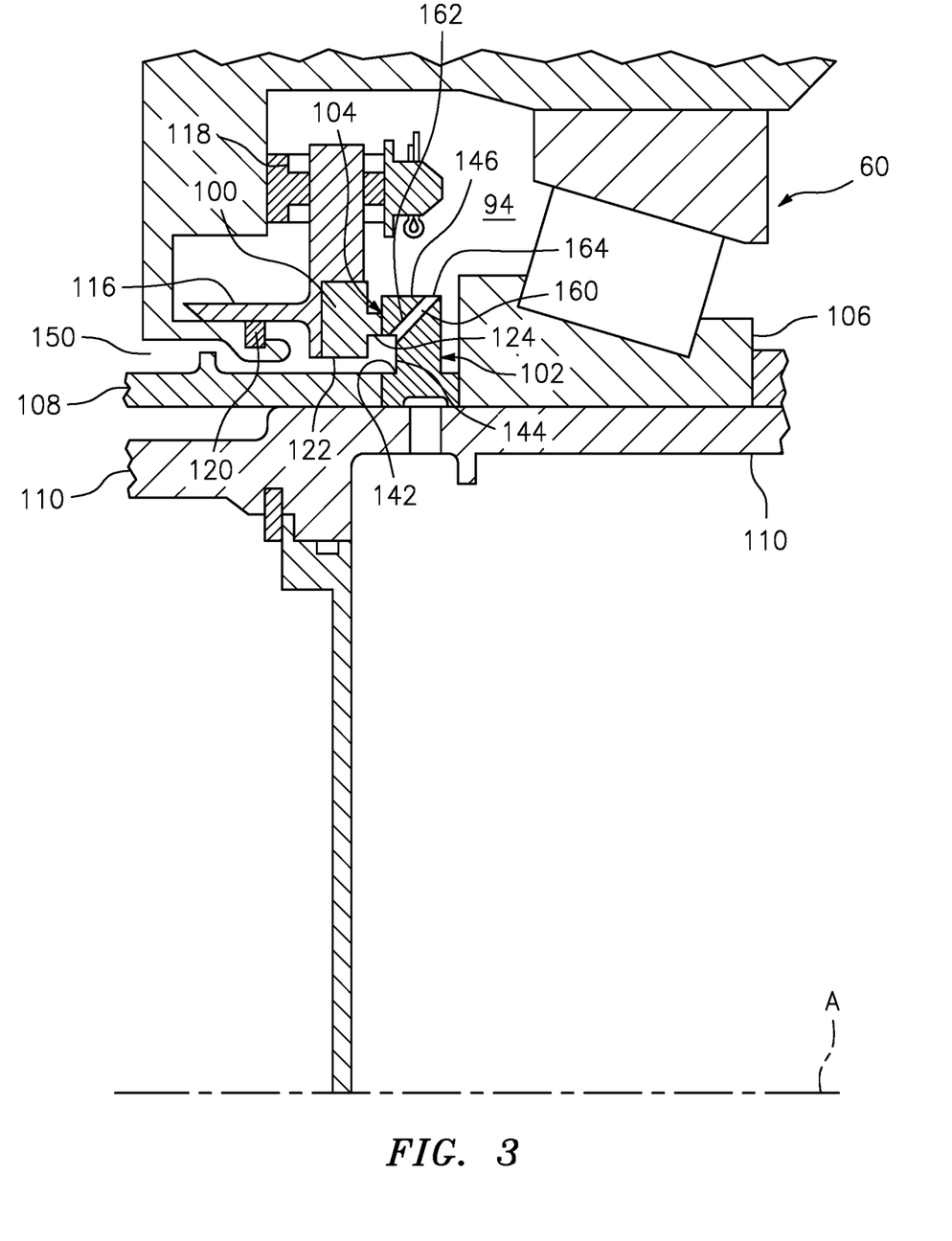
FIG. 3 is a sectional view of a seal assembly with an oil return passageway.

With reference to FIG. 3, the seal system 70 includes the annular seal element 100 and the annular rotating seal seat 102. The seal system 70 is configured as a dry seal assembly; e.g., a dry face seal. The seal system 70 is configured with a substantially dry seal interface 104 between the seal element 100 and the rotating seal seat 102 to minimize oil weepage at the seal interface 104 between the seal element 100 and the rotating seal seat 102.

The dry seal interface 104 minimizes the oil loss from the oil-wetted zone 94 when operable under a positive pressure differential during normal engine operation. The dry seal interface 104 is typically subject to low or zero pressure during engine start which may lead to oil loss from the oil-wetted zone 94.

The rotating seal seat 102 is mounted for rotation with a rotating component 110 and may be axially located between an inner race 106 of the bearing 60 and another rotating component 108; e.g., a tubular sleeve, slinger, etc. The rotating seal seat 102 may extend circumferentially at least partially around the rotating component 110.

Figure 4:
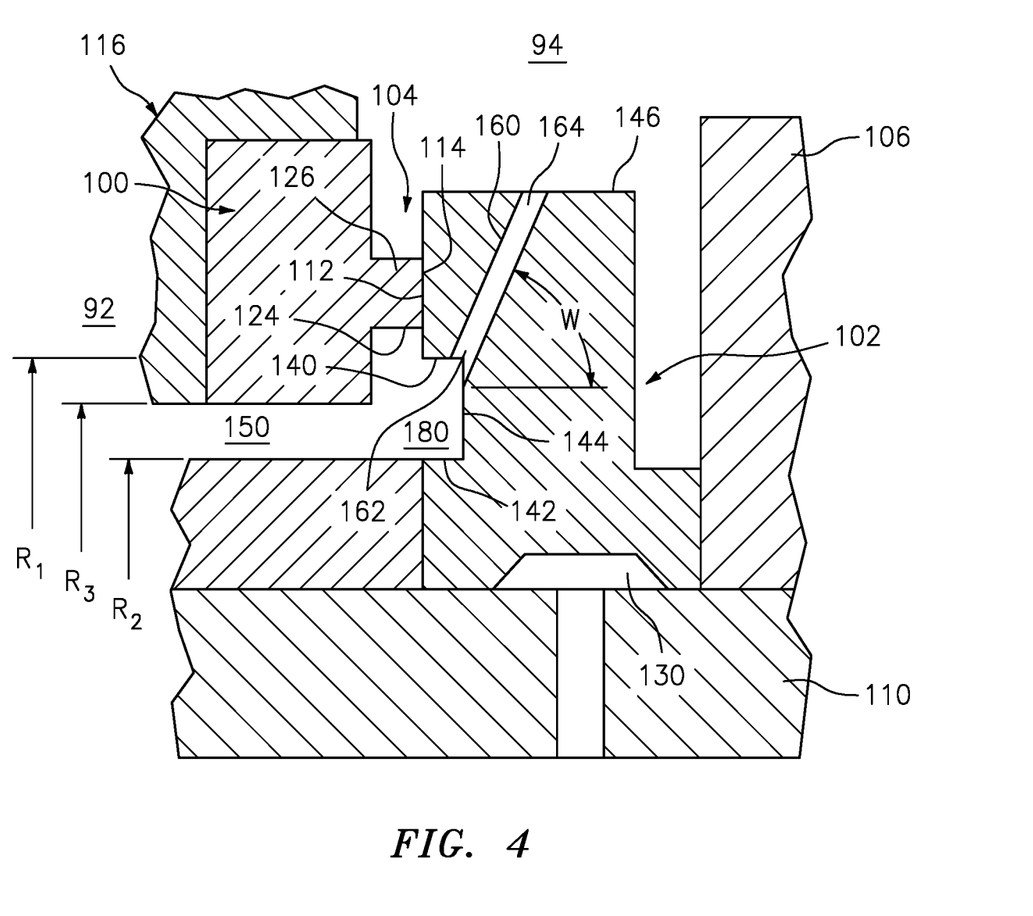
FIG. 4 is an expanded sectional view of the seal assembly of FIG. 3.

The seal element 100 has a radial seal surface 112 which is in interfacial contact with a radial seal face 114 (also shown in FIG. 4). The seal element 100 is retained by a seal carrier 116 with the assembly being urged by spring system 118 (FIG. 3) to maintain the sealing contact at the dry seal interface 104.

A secondary seal such as a piston ring 120 (FIG. 3) seals the inner circumference of the seal carrier 116 while permitting axial movement thereof under the bias of the spring system 118. An inward facing seal edge 122 of the seal element 100 is displaced from a radial inner face 124 of an annular ridge 126 that forms the radial seal surface 112 to interface with the radial seal face 114. The inner face 124 of the annular ridge 126 is adjacent to a dry zone annulus 150 adjacent to the dry seal interface 104.

An inwardly facing shoulder 140 of the rotating seal seat 102 has a radius of R1. The radius of an outward facing shoulder 142 indicated as R2 while radius R3 at the inward facing seal edge 122 of the seal element 100. A recessed face 144 is thereby formed between the inwardly facing shoulder 140 and the outward facing shoulder 142 of the rotating seal seat 102. A ratio between R1 and R2 is thereby provided to facilitate startup oil to return back to the oil-wetted zone 94.

The rotating seal seat 102 is configured with at least one oil return passageway 160. Each oil return passageway 160 is formed from an inlet 162 at the intersection of the inwardly facing shoulder 140 and the recessed face 144 to an outlet 164 through an outwardly facing surface 146 of the seal seat 102.

Figure 5:
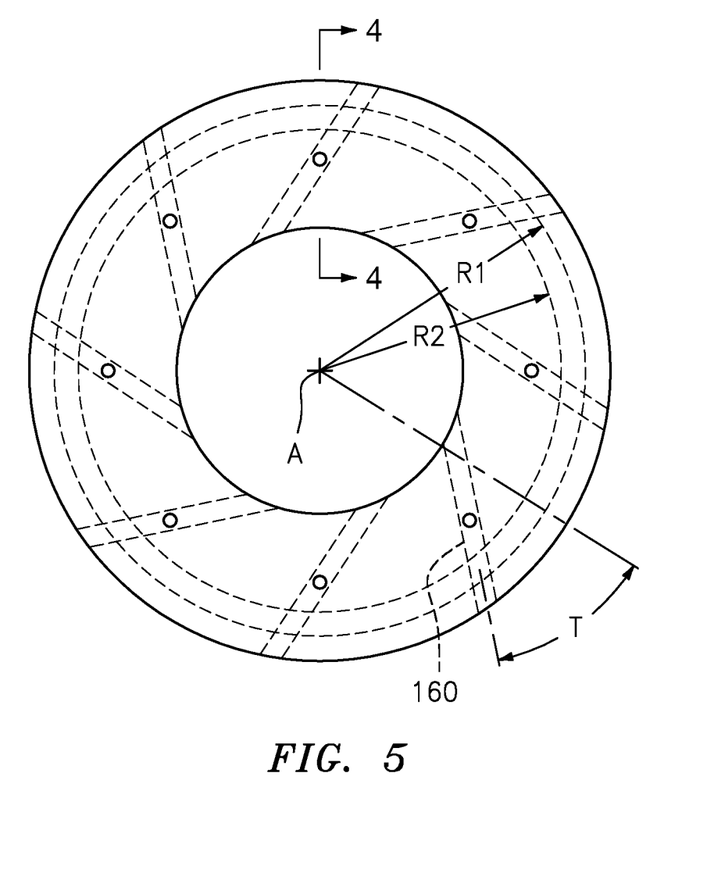
FIG. 5 is a face view of an annular rotating seal seat with an array of oil return passageways.

The oil return passageways 160 are arranged in an annular array about the engine axis A. Each oil return passageway 160 of the array may be angled with respect to the axis A at an angle W from between 0-45 degrees as well as being skewed at an angle T from between 0-45 degrees (FIG. 5). That is, the oil return passageways 160 provide a communication path for weepage oil from the dry zone annular space 180 outboard of the rotating component 108 back to the oil-wetted zone 94.

Weepage oil from the seal interface 104 may collect within the dry zone annular space 180 when the engine is not in operation. The dry zone annulus 150 terminates with the dry zone annular space 180 which may be generally rectilinear in cross-sectional shape and adjacent to the rotating seal seat 102. The oil return passageway 160 communicates oil weepage from the dry zone annular space 180 adjacent to the seal interface 104 between the seal element 100 and the rotating seal seat 102 to return the oil to the oil wetted zone 94. The oil return passageways 160 provide substantial pumping action from the dry zone annular space 180 because of the centrifugal action thereon during engine operation. This ratio has been found to optimize the dry zone annular space 180 geometry within the rotating seal seat 102 to reduce the boundary layer and provide substantial pumping action from the dry zone annular space 180 without otherwise compromising the dry seal interface 104. The oil return passageway 160 allows startup oil to return back to the oil-wetted zone 94. This minimizes oil weepage from the compartment and potential leakage into the gaspath.

Although the different non-limiting embodiments have specific illustrated components, the embodiments are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal system for a bearing compartment of a gas turbine engine comprising:
    an annular seal element;
    a rotating component adjacent the seal element;
    an annular rotating seal seat in contact with the seal element to form a dry seal interface therebetween to separate an oil-wetted zone from a dry zone, the annular rotating seal seat forming a dry zone annular space adjacent to the annular seal element and the rotating component; and
    the annular rotating seal seat having an oil return passageway through the rotating seal seat to provide a communication path from the dry zone annular space outboard of the rotating component back to the oil-wetted zone; wherein the dry zone annular space is formed in part by an undivided recessed face between an inwardly facing shoulder and an outward facing shoulder of the annular rotating seal seat.

2. The system as recited in claim 1, wherein the dry seal interface is formed in part by an annular ridge of the annular seal element.

3. The system as recited in claim 1, wherein the recessed face is planar in the absence of a flange between the inwardly facing shoulder and the outward facing shoulder of the annular rotating seal seat.

4. The system as recited in claim 3, wherein the outward facing shoulder of the annular rotating seal seat defines a radius R1 and the inwardly facing shoulder defines a radius R2.

5. The system as recited in claim 3, wherein the oil return passageway defines an inlet at an intersection between the outward facing shoulder of the annular rotating seal seat and the recessed face.

6. The system as recited in claim 4, wherein an inward facing seal edge of the seal element defines a radius R3 between R1 and R2.

7. The system as recited in claim 6, wherein the dry seal interface is formed in part by an annular ridge of the annular seal element, the annular ridge of the annular seal element defines a radial inner face outboard of the inward facing seal edge of the seal element.

8. The system as recited in claim 1, wherein the oil return passageway is one or an array of oil return passageways arranged about an engine central longitudinal axis, the oil return passageway angled with respect to the engine central longitudinal axis at an angle W from between 0-45 degrees.

9. The system as recited in claim 1, wherein the oil return passageway is one or an array of oil return passageways arranged about an engine central longitudinal axis, the oil return passageway skewed at an angle T from between 0-45 degrees.

10. The system as recited in claim 1, wherein the oil return passageway is one or an array of oil return passageways arranged about an engine central longitudinal axis, the oil return passageway angled with respect to the engine central longitudinal axis at an angle W from between 0-45 degrees and skewed at an angle T from between 0-45 degrees.

11. A seal system for a bearing compartment of a gas turbine engine comprising:
an annular seal element;
a rotating component adjacent the seal element;
an annular rotating seal seat in contact with the seal element to form a dry seal interface therebetween to separate an oil-wetted zone from a dry zone, the annular rotating seal seat forming a dry zone annular space adjacent to the annular seal element and the rotating component, the dry zone annular space formed in part by an undivided planar recessed face between an inwardly facing shoulder and an outward facing shoulder of the annular rotating seal seat, the outward facing shoulder of the annular rotating seal seat defines a radius R1 and the inwardly facing shoulder defines a radius R2; and
the annular rotating seal seat having an array of oil return passageways through the rotating seal seat around an engine longitudinal axis to provide a communication path from the dry zone annular space outboard of the rotating component back to the oil-wetted zone, each of the array of oil return passageways angled with respect to the engine central longitudinal axis at an angle W from between 0-45 degrees and skewed at an angle T from between 0-45 degrees.

12. The system as recited in claim 11, wherein the oil return passageway defines an inlet at an intersection between the outward facing shoulder of the annular rotating seal seat and the recessed face.

13. The system as recited in claim 11, wherein an inward facing seal edge of the seal element defines a radius R3 between R1 and R2.

14. The system as recited in claim 11, wherein the dry seal interface is formed in part by an annular ridge of the annular seal element, the annular ridge of the annular seal element defines a radial inner face outboard of the inward facing seal edge of the seal element.

* * * * *